Figures 4, 5:
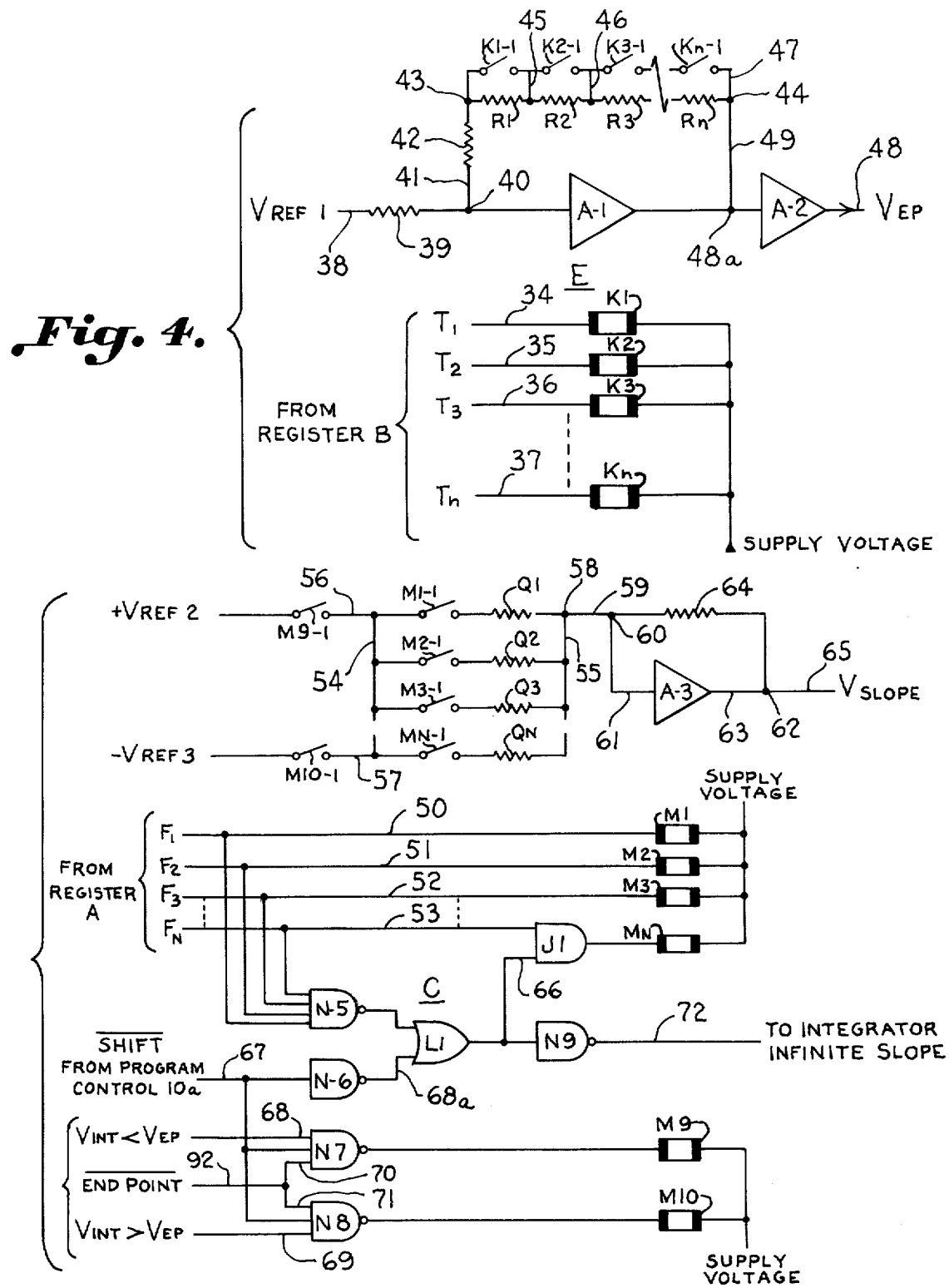

United States Patent [19]
Randolph

[11] 3,922,535
[45] Nov. 25, 1975

[54] PROCESS CONTROL APPARATUS FOR TEMPERATURE CONTROL

[75] Inventor: John H. Randolph, Greenville, S.C.

[73] Assignee: Courtaulds Engineering Limited, Coventry, England

[22] Filed: Nov. 12, 1970

[21] Appl. No.: 88,588

[52] U.S. Cl............................ 235/151.1; 236/46
[51] Int. Cl.².......................................... G05D 23/00
[58] Field of Search........ 235/151.1, 150.5; 236/46; 165/64, 169

[56] References Cited
UNITED STATES PATENTS

| | | | |
|---|---|---|---|
| 2,895,502 | 7/1959 | Roper et al. | 236/46 |
| 3,301,482 | 1/1967 | Bullen | 236/46 |
| 3,311,303 | 3/1967 | Noyes | 236/46 |
| 3,392,914 | 7/1968 | Nienstaedt | 235/151.1 X |

Primary Examiner—Joseph F. Ruggiero
Attorney, Agent, or Firm—Davis, Hoxie, Faithfull & Hapgood

[57] ABSTRACT

An apparatus for controlling the operation process of a physical system according to a predetermined operating cycle. The apparatus includes a digital register, a digital to analogue converter, and an integrator which produces a signal corresponding to the desired slope or change in said process. Another means is provided for generating a steady state signal indicating the end point of the change. A comparator is provided for comparing the integrated signal with the steady state signal for generating a compared signal for determining whether the steady state signal or the integrated signal will be coupled to the controller for controlling the operation thereof. The apparatus is also provided with a sign indicating means for generating a signal indicating the direction that the process is to be varied and means for causing the integrator to begin integrating at a value where it left off at the end of the previous cycle.

10 Claims, 7 Drawing Figures

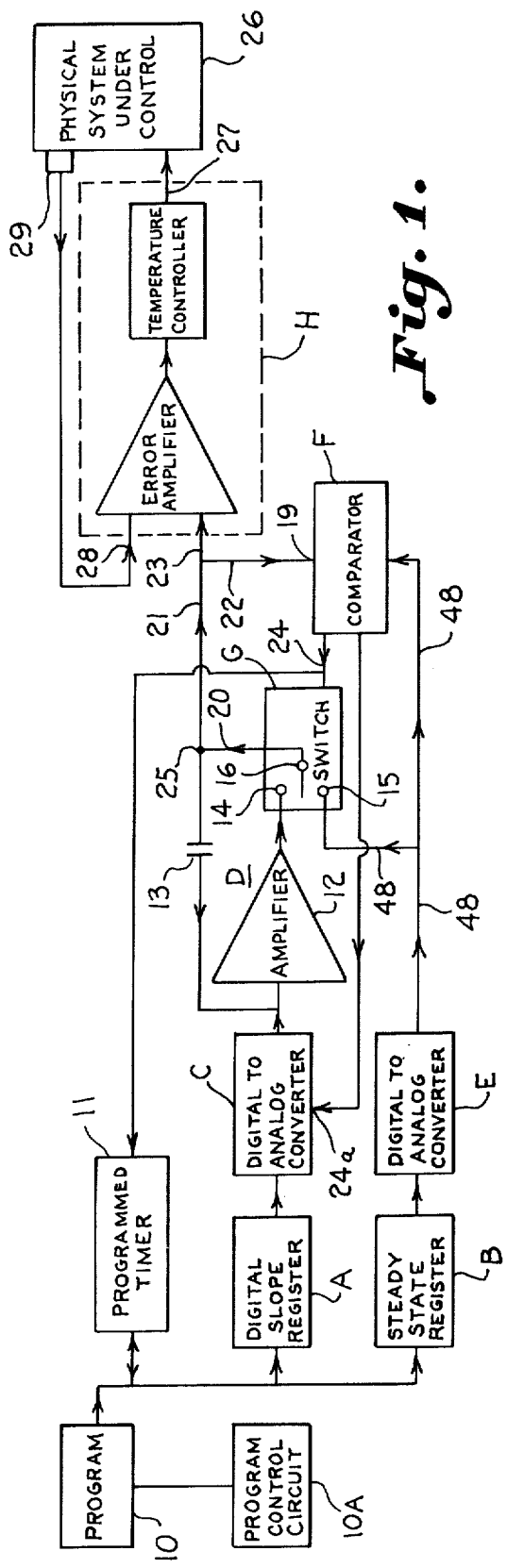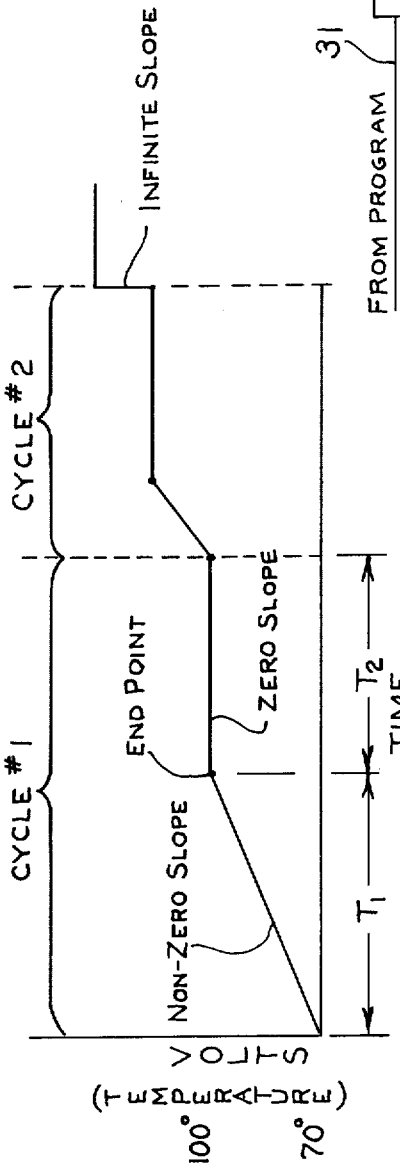

PROCESS CONTROL APPARATUS FOR TEMPERATURE CONTROL

This invention relates to an apparatus for controlling the operation of a process, and more particularly to an apparatus which utilizes an integrated signal for varying the process and a steady state signal for maintaining the process at a constant state.

Heretofore, there have been many apparatus developed for controlling processes either manually or according to a predetermined program. One particular process wherein it is necessary to vary the temperature during a particular operating cycle is dyeing cloth and the like. The temperature of the dye or liquid medium has to be varied during the dyeing cycle. Some systems are manually controlled by opening steam valves when it is desired to raise the temperature of the dyeing medium, and opening water valves to cool the temperature of the medium. The operators must be very precise in opening and closing these valves or the cloth or yarn being dyed may not obtain the desired color or quality.

In order to overcome the possibility of error in manually controlling the processes various systems have been produced for automatically controlling the dyeing operation according to predetermined programs.

Some such program controllers are illustrated in U.S. Pat. No. 3,275,988 granted to E. W. Yetter, U.S. Pat. No. 2,932,471 granted to Exner et al., U.S. Pat. No. 3,392,914 granted to Nienstaedt, U.S. Pat. No. 3,371,718 granted to Clairborne et al., and U.S. Pat. No. 3,129,323 granted to Stout et al. Some of these systems, such as shown in the Nienstaedt U.S. Pat. No. 3,392,914, rely on digital signals for varying the temperature in the system. One problem with utilizing digital systems is that the slope curve is generated by a plurality of steps rather than a smooth line such as is capable of being produced by analogue signals. The Exner et al., U.S. Pat. No. 2,932,471 also discloses a digital control unit.

The advantage of the digital control units over the analogue units is that in a digital system a particular temperature or voltage can be more accurately maintained at a constant level than an integrated signal.

Therefore, one of the primary purposes of the subject invention is to take advantage of the desirable features of both the digital and analogue systems. In the subject invention an analogue signal is utilized to vary the temperature when it is desired to make a change, whereas, a steady signal is utilized when it is desired to hold the process at a particular state, or if the temperature is being controlled in the process, maintain such constant.

While reference is being made throughout this application to varying temperatures, it is to be understood of course, that the subject invention may be utilized to control various systems, such as the operation of cutting tools, servo systems, chemical processes, etc.

Accordingly, it is an important object of the present invention to provide an improved apparatus for controlling the operating process of a physical system.

Another important object of the present invention is to provide a combined analogue and digital system for varying the operation of the process with the analogue signal and holding the process constant with a steady state signal.

Another important object of the present invention is to provide an apparatus for controlling the operation of a physical system which apparatus is operated in an improved manner and can be readily controlled by a preprogrammed member.

Still another important object of the present invention is to provide a system for varying the operation of a process which utilizes an integrator including a capacitor for producing an integrated signal for varying the process and utilizing a steady state signal for holding the process constant and maintaining a potential on the capacitor during the holding period.

The construction designed to carry out the invention will be hereinafter described, together with other features thereof.

Figure 6:
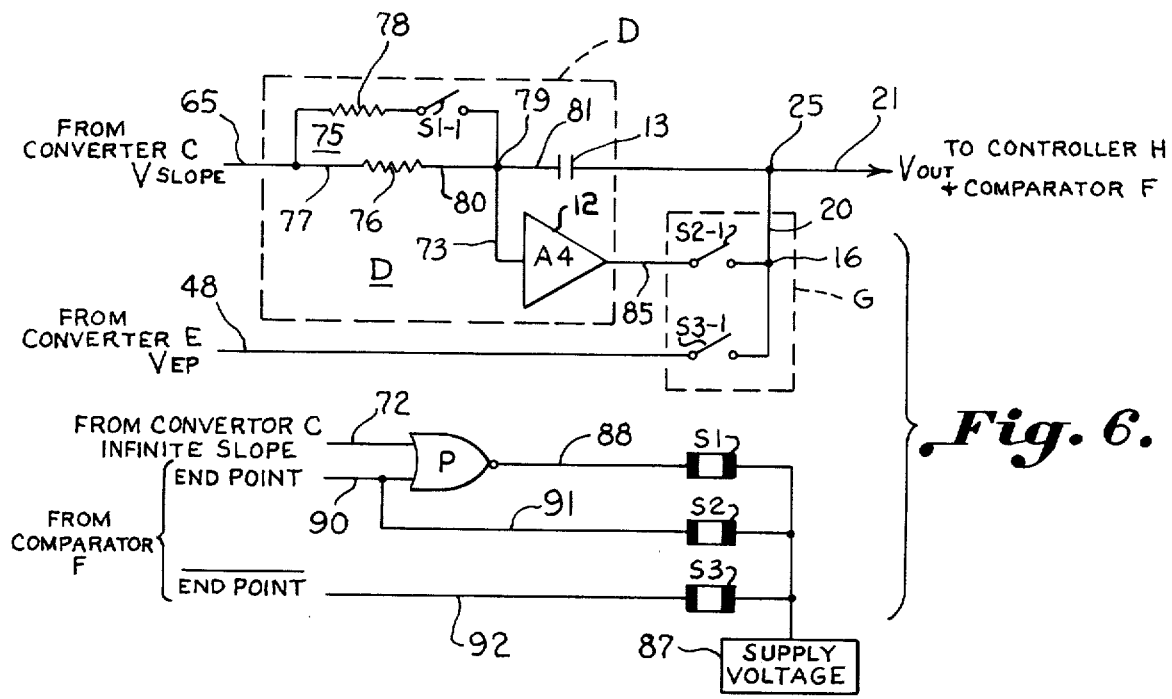
Figure 7:
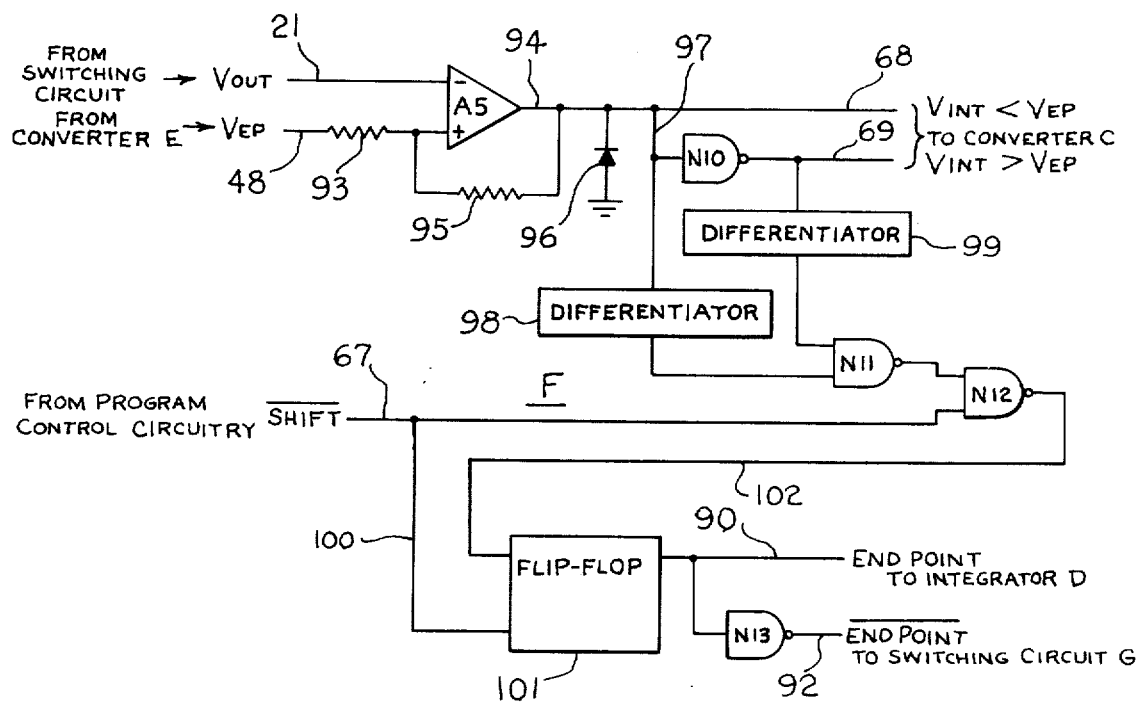

The invention will be more readily understood from a reading of the following specification and by reference to the accompanying drawings forming a part thereof, wherein an example of the invention is shown and wherein:

FIG. 1 is a block diagram showing the apparatus controlling the operation of a process constructed in accordance with the present invention, FIG. 2 is a typical voltage curve that may be produced by the apparatus, FIG. 3 is a block diagram illustrating one stage of the digital registers, FIG. 4 is a diagrammatic representation of one digital to analogue converter which may be utilized in the apparatus, FIG. 5 is a diagrammatic representation of another digital to analogue converter which may be utilized in the apparatus, FIG. 6 is a diagrammatic representation of an integrating circuit and switching circuit which may be utilized in the invention, and FIG. 7 is a diagrammatic representation of a comparator which may be utilized in the invention.

Referring in more detail to the drawings, there is illustrated an apparatus for controlling temperature variations of a medium during a process according to a predetermined program comprising a first digital register A for storing information in the form of a rate of change signal indicative of the desired change in temperature of said medium during the process. A second digital register B is provided for storing information in the form of a steady state signal representing the end point of the change of the temperature of the medium. A first digital to analogue converter C is coupled to the output of the first digital register A for converting the rate of change signal to an analogue signal representing rate of change. An integrating means D is coupled to the output of the first digital to analogue converter C for integrating the analogue signal representing rate of change producing an integrated signal. A second digital to analogue converter E is coupled to the output of the second digital register B producing a steady state second analogue signal representing the end point of the change of the temperature of the medium. A comparator F is coupled to the output of the integrator and the second digital to analogue converter for generating a compared signal indicating whether the integrated signal or the steady state signal is larger. A switching circuit G is coupled to the integrating means D and the second digital to analogue converter E. A controller H is coupled between the switching circuit G and the medium whose temperature is being controlled. Means is provided for coupling the comparator F to the switching circuit G for causing the integrated signal or the second steady state analogue signal to be coupled to the controller H, depending on the compared signal.

The controller includes means for varying the temperature of the medium according to the integrated signal and holding the temperature steady according to the second analogue signal. The integrating means D includes a capacitor. Means is provided for coupling the capacitor to the steady state signal when the steady state signal is coupled to the controller for maintaining a potential on the capacitor substantially equal to the analogue signal.

Thus, when the information stored in the first and second digital register is updated, the integrator will begin integrating at the potential of the last end point.

The system is also provided with a sign indicating means which indicates whether the integrated signal must increase or decrease to become equal to the second analogue signal. Means is provided for coupling the sign indicating signal to the first digital to analogue converter C for causing the signal representing rate of change produced by the first digital to analogue converter to have a polarity determined by the sign indicating signal.

Referring to FIG. 1 of the drawings, there is illustrated a block diagram of the apparatus for controlling the operating process of a physical system, such as varying the temperature of a medium during a process. The desired information for controlling the operation of the process may be stored on the program carrier such as illustrated by the reference character 10, and may take the form of a punched paper tape, magnetic tape, or any suitable conventional storage device. The information on the program 10 includes digital representations of the desired slopes of the changes in temperature, digital representations representing the end points of the slopes, and digital information for determining the lengths of zero slope lines. The information representing the desired slope is fed off the program carrier 10 by any suitable reader, and supplied to a first digital register A which stores such information. The digital information representing the end point of the particular slope is stored in the digital register B and the digital information representing the duration or the length of the zero slope line segment is stored in the program timer 11, which may be any suitable conventional timer.

FIG. 2 illustrates a sample operating curve which may be desired in a particular process. The curve represents volts as compared to time. The volts are directly proportional to temperature. Therefore, in the first cycle it may be desired to raise the temperature from 70° to 100° within the first time period T1 of the operating cycle and then hold the temperature at the 100° level for the time period T2. As can be seen in FIG. 2, the non-zero slope line extends from the 70° point to the end point which is reached when the temperature of the medium reaches 100°. At this point the temperature of the medium is held constant, as indicated by zero slope, for the time period T2 which terminates at the end of the first cycle. New information is then supplied to the registers A and B from the program carrier 10 for controlling the operation of the next cycle of the process. As can be seen from reviewing the curve in FIG. 2, the non-zero slope line is very straight and accordingly, an accurate slope is produced from the 70° point to the 100° point. This non-zero slope line is created by the integrator D. However, at the end point of the non-zero slope line it may be desired to hold the 100° temperature, for example, 20 minutes. The integrator in some instances is not suitable for holdinig the zero-slope line at a particular point accurately due to drift. Therefore, a steady state signal is utilized for creating the zero-slope line. The steady state signal can hold the voltage of the zero-slope line more accurately than an integrator.

Referring back to FIG. 1, as previously mentioned, stored in the digital register A is information representing the non-zero slope line, and stored in the digital register B is the steady state information.

The steady state information determines the end point of the non-zero slope line and the length of the zero slope line is controlled by information stored in the program timer 11.

The program carrier 10, the program timer 11, the program control circuit 10a, the digital registers A and B, and the digital to analogue converter E all can be any suitable conventional item and, therefore, a detailed description of such is not required. The information representing the non-zero slope is fed out of the digital register A into a digital to analogue converter C which converts such information into an analogue signal. This analogue signal is, in turn, fed to the integrator D for generating an integrated signal having an amplitude proportional to the time integral of the analogue slope signal coming out of the digital to analogue converter C. The integrator in the particular embodiment illustrated includes an operational amplifier 12 and a feed-back capacitor 13.

The feed-back capacitor 13 is connected in shunt with the operational amplifier 12 through the switching circuit G when the output of the integrator is less than the steady state signal stored in the digital register B. The switching circuit G includes a pair of input terminals 14 and 15, respectively, and an output 16. Connected to the input terminal 14 is the output of the operational amplifier 12 forming part of the integrator D. Connected to input terminal 15 of the switching circuit G is the output of the digital to analogue converter E. The digital to analogue converter E receives the digital information from the digital storage register B and converts such to a steady state analogue signal. This steady state signal is fed via lead 48 to one input of the comparator F. Connected to another input 19 of the comparator F is the output of the switching circuit G through leads 20, 21 and 22, which supplies the integrated signal representing the non-zero slope line. When the integrated signal is smaller than the steady state signal coming in on the input 48 of the comparator the switching circuit G makes contact between the input terminal 14 and the output terminal 16 for allowing the integrated signal to be placed on the output lead 23. However, when the integrated signal coming in on lead 22 to the comparator F is equal to the steady state signal coming in on lead 48, a compared signal is fed over lead 24 to the switching circuit G causing the switching circuit to make contact between the input terminal 15 and the output terminal 16 allowing the steady state signal to be fed over leads 20 and 21 to the output lead 23. When the steady state signal is fed to the output lead 23 the circuit between the input terminal 14 and the output terminal 16 of the switching circuit is open and there is no potential placed on the feed-back capacitor 13 by the operational amplifier 12. However, since the feed back capacitor 13 is coupled at junction 25 to the steady state signal flowing through the switching circuit, the feed back capacitor 13 is maintained at the potential of the steady state signal.

The steady state signal is supplied to the output lead 23 for a period of time which is controlled by the program timer 11. After the elapse of the desired duration of the zero-slope, new information is fed into the program timer, the digital register A and the digital register B for generating another cycle of operation.

Digital-to-analogue converter C generates an analogue voltage as a function of the number stored in register A and supplies the voltage to the input of integrating amplifier 12. Converter C receives digital signals from comparator F which determine whether the output voltage of converter C is positive, negative, or zero. When the device is generating a non-zero slope line, the output of the converter C is positive or negative according to whether the output voltage of integrating amplifier 12 must increase or decrease to become equal to the steady state output voltage of converter E. When the output voltage of integrating amplifier 12 becomes equal to the steady state output voltage of converter E, the output voltage of converter C becomes zero for reasons which will be made clear below.

Integrating amplifier 12 and feed-back capacitor 13 form an analogue integrator whenever the output of amplifier 12 is coupled to capacitor 13 through switching device G. At such times the output of the device at junction 25 is the output of integrating amplifier D which, as pointed out earlier, varies linearly with time at a rate depending upon the output voltage of converter C and a multiplying constant. The multiplying constant is determined by the values of capacitor 13 and an input resistance to the integrator.

An additional function of digital to analogue converter C will be presented here for reasons of clarity. When the number stored in register 4 is zero (no slope number stored) the output voltage of converter C assumes a non-zero value with proper sign and converter C supplies to the input stage of the integrator a signal which reduces the input resistance of the integrator to a small value, resulting in rapid integration by the integrator. This rapid integration results in a signal with a very steep slope at the junction 25. This slope is infinite for all practical purposes. Thus, an infinite slope is produced by the device when no other non-zero slope is desired.

Switching device G serves to switch the output of the device (junction 25) from the output of integrating amplifier 12 to the steady state output of digital to analogue converter E when the end point of a non zero slope line segment has been reached, as determined by comparator F. In this condition the device maintains a true zero slope voltage at junction 25. It should be noted that feed-back capacitor 13 is coupled to the output junction 25 so that when switching device G assumes the zero slope position as described above, the side of the capacitor which was coupled to the output of amplifier 12 is now coupled to the constant voltage output of converter E. As mentioned earlier, the output voltage of converter C is zero at this time. A signal is now supplied by comparator F to reduce the input resistance to amplifier 12 to a small value so that capacitor 13 is effectively shunted across the constant voltage output of converter E. When at some later time switching device G is reversed and new information is stored in registers A and B, the device begins to generate a new non-zero slope line beginning at the last end point.

Comparator F compares the analogue voltage at output junction 25 with the analogue voltage at the output of converter E and developes digital signals used by the other parts of the apparatus dependant on the relative values of these two analogue voltages. Comparator F supplies a set of signals to digital to analogue converter C whose states depend upon which of the compared voltages is greater, this set determining the sign of the output voltage of converter C. Comparator F developes another set of signals which are in a predetermined state at the beginning of generation of a non-zero slope, and which change states at the time when the end point voltage is reached regardless of whether the slope is positive or negative. This set of signals is used to control switching device G, to cause the output voltage of converter C to become zero, and to reduce the input resistance to the integrator to a small value, all previously described.

Interposed between the output lead 23 which is, in turn, coupled to the switching circuit G, and the physical system under control, generally designated by the reference character 26, is a process controller H which supplies electrical signals to a device (not shown) which converts the electrical signals to physical operations. The controller may be any suitable conventional controller. The particular controller illustrated has an input which is coupled to the output lead 23 which receives information representing the desired instantaneous value of the process variable, an input 28 which receives information representing the actual value of the process variable, and an output 27 which supplies information representing an adjustment to the process 26 which causes the controlled variable to be maintained at the desired value. Information representing the actual value of the controlled variable is supplied to input lead 28 via a transducer 29 which is coupled to the medium in the physical process, and is responsive to temperature variations of the medium. Information representing desired instantaneous value of the medium is supplied by the apparatus forming the subject invention. By comparing the information at the two inputs 23 and 28 the controller H determines what adjustment to the process is necessary to reduce the difference between the desired and actual values of the controlled medium, and it supplies information representing this adjustment to an operator (valve, motor, etc) coupled to the physical process. The resulting action by the operator causes the controlled variable to change in a manner so that the difference between actual and desired values of the medium is reduced.

Various systems utilizing controllers are illustrated in U.S. Pat. No. 3,174,298 granted to Kleiss, U.S. Pat. No. 3,284,615 granted to Yetter, U.S. Pat. No. 3,143,167 grant to Vieth, U.S. Pat. No. 3,098,995 granted to Mundt, and U.S. Pat. No. 2,366,500 granted to Eastin.

Referring in more detail to FIG. 3 of the drawings, there is illustrated a single stage of the digital register which could be either register A or B. The purpose of the stage is to store binary information being taken off the program carrier 10. If a binary "1" is supplied to the input terminal 31 of the stage, when a clock pulse C is applied momentarily to input terminal 34 that bit of information is stored in the register and a logic "1" is presented on the output terminal 32 and a logic "0" is presented at output terminal 33. When there is no clock pulse present on the input 34 any information that may be received on the input terminal 31 is not stored in the register, and thus the outputs 32 and 33 are not affected. The opposite outputs are obtained on the output terminals 32 and 33 when a logic "0" is applied to the input terminal 31 simultaneously with a clock pulse C.

The information coming out of register B is fed to the input of the digital to analogue converter E for being converted to a steady state analogue signal. FIG. 4 illustrates in schematic form the details of the digital to analogue converter E. It is to be understood that any suitable conventional digital register can be used for the registers A and B and, also, any suitable conventional digital to analogue converter could be used in place of the converter E. The converter E includes a plurality of input terminals 34 through 37. The exact number of input terminals depend on the number of bits being used to make up a word. In one particular embodiment an eight bit word is used to store the steady state information. When a binary "0" bit of information is supplied to a terminal, such as 34 through 37, it energizes the respective relay K*l* through K*n* which, in turn, closes its respective contact K*l–l* through K*n–l*. It is noted that the relays K*l* through K*n* are each connected in a respective circuit extending between a supply voltage and the output of a respective stage of the register B.

The converter E includes a reference voltage which is coupled to lead 38 which has a register 39 interposed therein. Also, interposed in lead 38 is an operational amplifier A1. Connected in shunt with the operational amplifier A1 are a plurality of resistors R*l*–R*n* that are selectively shunted by the operation of the relays K*l* through K*n*. The resistors are coupled to lead 38 at junction 40 by lead 41. A resistor 42 is coupled between junction 40 and junction 43 connected to lead 41. Between junction 43 and junction 44 are the plurality of resistors R1 through R*n* which are connected in series. Interposed between each of the resistors R1 and R*n* is a junction to which leads 45, 46 and 47, respectively, are coupled for connecting a respective relay contact K*l* through K*n* in shunt with each of the resistors R1 through R*n*. The relay contacts K*l* through K*n* when closed are connected in series.

Junction 44 is coupled to lead 38 at junction 48*a* by lead 49. Connected between junction 48*a* and the output of the converter is a non-inverting amplifier A2.

When it is desired to convert a digital word to an analogue signal the digital information is supplied to the input terminals 34 through 37, respectively. For example, if the digital word included a binary "0" coming in on input leads 34 and 36 and binary "1's" on input leads 35 and 37 such would cause relays K1 and K3 to be energized. Relays K2 and K*n* remain de-energized. The energization of the relays K1 and K3 would close contacts K*l*–1 and K3–1 shunting resistors R1 and R3. Therefore, series register 42 and shunt resistors R2 and R*n* would then be connected in shunt with operational amplifier A*l*. Operational amplifier A1 amplifies the reference voltage applied to lead 38 according to the ratio of the total resistance supplied by resistors 42, and R*l* through R*n*, as compared to resistor 39. Thus, by varying the resistance in shunt with the operational amplifier A*l* by opening and closing contacts K*l* through K*n*, the output of the digital to analogue converter (voltage end point) VEP varies according to the input binary information as long as the values of the resistors R*l* through R*n* are scaled according to the digital information supplied to the inputs 34 through 37. The non-inverting amplifier A2 coupled to the output of operational amplifier A1 is provided for increasing the voltage level to a value that can be handled by the following circuitry.

The digital to analogue converter C illustrated in FIG. 5 receives signals F1 through FN from digital register A. These signals are fed in on leads 50 through 53 to a respective relay M1 through MN. The other side of the relays M1 through MN are coupled together and connected to a supply voltage which is approximately equal to a voltage representing a binary "1". The relays M1 through MN control the relay contacts M1-1 through MN-1. Relay contacts M1-1 through MN-1 are each connected in series with a respective resistor Q1 through QN. The series combinations of relay contacts M1-1 through MN-1 and resistors Q1 through QN are connected in parallel between leads 54 and 55. Lead 54, in turn, is connected between one end of leads 56 and 57. The other end of lead 56 is connected to a positive referene voltage VREF-2. Interposed in lead 56 between the reference voltage and lead 54 is a relay contact M9-1. The other side of lead 57 is connected to a negative reference voltage VREF-3. Interposed in lead 57 is relay contact M10-1. The magnitude of reference voltages VREF-2 and VREF-3 are the same, but these voltages are of the opposite polarity. Lead 55 is connected to the junction 58 which is, in turn, coupled through lead 59 to junction 60. Operational amplifier A-3 is coupled between junction 60 via lead 61 and junction 62 via lead 63. Resistor 64 is connected between junction 60 and 62 in parallel with operational amplifier A-3. Junction 62 is coupled to the output of the converter C via lead 65 for providing a voltage representing the desired slope or rate of change that is to take place in the operating process during a given cycle.

The closing of relay contacts M9-1 and M10-1 control the polarity of the output analogue signal appearing on the output lead 65. When contact M9-1 is closed, the positive reference voltage VREF-2 is supplied through the parallel resistor network which includes resistors Q1 through QN to the input of the operational amplifier A-3 causing the amplifier to produce a negative output analogue signal. When relay contact M10-1 is closed and relay contact M9-1 remains open the negative reference voltage VREF-3 is supplied to the input of the operational amplifier A-3 through the resistor network to produce a positive output analogue voltage on the output lead 65 indicative of the desired slope. The magnitude of the output voltage V slope is determined by the following formula:

$$V \text{ slope} = \pm \text{ VREF (Resistor 64)/(Resistance of Network Q1-QN)}$$

Whereas, the resistance of network Q1 through QN is equal to the parallel resistance of those resistors Q1 through QN whose respective relay contact M1-1 through MN-1 is closed. The values of resistors Q1 through QN are scaled upwardly corresponding to the binary information that energizes the respective relay for closing the contact in series therewith.

The digital signal coming in on input lead 53 of the converter is fed to one input of an AND gate J-1. The output of the AND gate J-1 is, in turn, connected to relay MN. The other input 66 of the AND gate J-1 is supplied from a logic circuit which is discussed below. While earlier it was described that the relay MN was connected to lead 53, it is to be understood that it is connected to lead 53 through the AND gate J-1.

The logic circuit includes NAND gate N-6, and OR gate L-1 which produces an output that is fed to the input of the AND gate J-1. The output of the OR gate L-1 is also connected to NAND gate N-9 which acts as an inverter and supplies a logic signal on its output to the integrator D. The NAND gate N-5 has N number of inputs, each of which is coupled to a respective line which receives the binary information from the register A, such as lines 51 through 53. When all of the inputs coming in from the register A on lines 50 through 53 go to a logic "1" the output of NAND gate N-5, which is fed to an input of OR gate L-1, becomes a logic "0". NAND gate N-6 is coupled via lead 67 to a "not shift" signal coming from the program control circuit 10a. The output of NAND gate N-6 is connected via lead 68a to an input of OR gate L-1.

The "not shift" logic signal coming in on lead 67 is also connected to input of NAND gates N-7 and N-8. NAND gate N-7 has another input 68 coupled for receiving a compared signal VINT<VEP from the comparator F indicating that the integrated signal VINT is less than the steady state signal VEP produced by the digital to analogue converter E. The NAND gate N-8 has an input terminal 69 which is connected to the comparator F for receiving a compared signal VINT>λ VEP from the comparator indicating when the output signal VINT from the integrator is greater than the steady state output VEP from the digital to analogue converter E. In other words, the input coming in on leads 68 and 69 of NAND gates N-7 and N-8 are complementary signals. The NAND gates N-7 and N-8 also each have inputs 70 and 71, respectively, which are coupled to the comparator F for receiving a signal "not end point", that is produced by the comparator F prior to the output of the integrator D equaling the output from the digital to analogue converter E. A relay M-9 is coupled between the output of NAND gate N-7 and a supply voltage. A relay M-10 is coupled between the output of NAND gate N-8 and a supply voltage. Therefore, the relays M-9 and M-10 are activated to close relay contacts M9-1 and M10-1, respectively, when the output of NAND gates N7 and N8 are logic "0", respectively. Only one of the outputs from N7 and N8 can be in a logic "0" at a time, since the input signals coming in on leads 68 and 69 are complementary. However, both the NAND gates N7 and N8 can have a logic "1" on their output simultaneously whenever the signal coming in on lead 67 "not shift" goes to a logic "0" or the signal "not end point" goes to a logic "0".

In summarizing the operation of the digital to analogue converter C the relays M9 and M10 are used for controlling the polarity of the output signal appearing on line 65 entitled V-slope. The NAND gates N7 and N8 either energize relay M9 or M10, depending on whether the output voltage of the integrator VINT is less than the steady state output voltage VEP which is the output voltage of the digital to analogue converter E, or whether the output voltage of the integrator is greater than the output voltage of the steady state signal from the digital to analogue converter E. This is accomplished by closing the relay contacts M9-1 or M10-1 to connect either the positive reference voltage VREF 2 or the negative to reference voltage VREF 3 to the parallel resistor circuit coupled to the input of amplifier A3.

When there is a logic "0" signal coming in on line 67 connected to NAND gate N6, as well as NAND gates N7 and N8 representing "not shift", the outputs of NAND gates N7 and N8 go to a logic "1" preventing relays M9 and M10 from being energized. If the signal "not end point" which is applied to the inputs of NAND gates N7 and N8 is a logic "0", such will also prevent relays M9 and M10 from being energized. Therefore, in order for relays M9 and M10 to be energized the signals "not shift" and "not in point" must be a logic "1". If either relay M9 or M10 is energized, such closes a respective contact M9-1 or M10-1 applying either the positive VREF 2 or the negative VREF 3 voltage to the input of amplifier A3 through the resistive network. However, if both of the relays M9 and M10 remain de-energized, then neither the VREF 2 voltage or the VREF 3 voltage is applied to the input of amplifier A3 causing a zero output to be produced on lead 65. This zero signal appearing on the output of lead 65 is utilized in the circuit and will be discussed more fully below.

Sometime during the operating process it is desirable to raise, for example, the temperature of the medium under control at the fastest rate possible. In order to accomplish this the signal supplied to the controller H representing the desired temperature is changed immediately in a step fashion referred to as "infinite slope", and as shown in FIG. 2 is represented by the vertical line so labeled. In this condition the rate of change of the process or temperature is limited only by the physical capabilities of the system under control. The infinite slope signal is under control of the digital to analogue converter C and particularly the NAND gates N5, N6, OR gate L1, NAND gate N9 and AND gate J-1. If the inputs from register A coming in on lines 50, 51, 52 and 53 indicate no slope signal stored therein, such represents that an infinite slope is desired. At such time the inputs to NAND gate N5 are all logic "1" producing a "0" at the output of NAND gate N5 and at the input of the OR gate L-1. If the signal on line 68a coming into OR gate L-1 from NAND gate N6 is also a logic "0", the output of OR gate L-1 is logic "0". Since NAND gate N9 only has a single input which is coupled to the output of OR gate L-1, it acts as an inverter and inverts the logic "0" input signal to a logic "1" which appears on the output lead 72 and is identified as "infinite slope" signal. This infinite slope signal is applied to the integrator D as shown in FIG. 6, and in particular to the input of the NOR gate P. The operation of such will be discussed more fully when describing the integrator and switching device. Since the output of the OR gate L-1, which is logic "0" is coupled to input 66 of AND gate J-1, the output of J-1 is also logic "0" energizing relay MN and, in turn, closing contacts MN-1. Since either contact M9-1 or M10-1 is closed as described previously, and since contacts M1-1, M2-1 and M3-1 are open as described previously, the input to amplifier A3 has a fixed input current of proper sign determined by resistance QN. Thus, the output on lead 65 of amplifier A3 has a fixed voltage of proper sign which is used as a reference voltage for the integrator to generate an infinite slope. When the signal "not shift" coming in on lead 67 to the input of NAND gate N6 goes to a logic "0" a logic "1" signal is applied to the input of OR gate L-1. This condition always produces a logic "1" on the output of OR gate L-1 which is attached to the inputs of AND gate J-1 and NAND gate N9. Thus, the output of NAND gate N9 on lead 72 labeled "infinite slope" is a logic "0", and the output of J-1 is a logic "1" preventing energization of relay MN. In addition, when there is a logic "0" input coming in on lead 67 labeled "not shift", such deactivates the circuit as previously mentioned by opening contacts M9-1 and M10-1.

The purpose of the digital to analogue converter C, among other things, is to produce an output voltage on lead 65 which is coupled to the input of the integrator D. This voltage has the proper polarity to cause the integrator to integrate in the desired direction and the proper magnitude to cause the output of the integrator to produce the desired slope. When an infinite slope is desired the output voltage of converter C has a fixed value, which in one embodiment is approximately one-half the maximum value that can be produced by manipulating the contacts M1-1 through MN-1. When a "zero" slope is desired the output of integrator C is "zero" since relay contacts M9-1 and M10-1 are open.

Referring now to FIG. 6, there is illustrated both the integrator and the switching device. The switching device G includes the contacts S2-1 and S3-1 and the relays for controlling the operation of such. The remainder of the circuit illustrated in FIG. 7 forms the integrator D. The integrator D has input lead 65 which is coupled to the output of the digital to analogue converter C for receiving the V-slope signal. Input 65 is connected to an input lead 73 of an operational amplifier A4 through a resistance network 75. The resistance network 75 includes resistor 76 connected to lead 65 through lead 77. Connected in shunt with resistor 76 is a resistor 78 which has connected in series therewith switch contact S1-1. One side of switch contact S1-1 is connected to junction 79 which is also connected to the input of amplifier A4 through lead 73. Junction 79 is also coupled to resistor 76 through lead 80. Capcaitor 13 is coupled to junction 79 via lead 81. The other side of capacitor 13 is coupled to junction 25 which is, in turn, connected to the output lead 21, which is sometime referred to as the output of the switching circuit G. The switching circuit is coupled between junction 25 via lead 20 and the output terminal 48 of converter E. It is also coupled via lead 85 to the output of the operational amplifier A4 of the integrator D. The output of the operational amplifier is connected through switch contact S2-1 to junction 16 interposed in lead 20. The output of the converter E is also coupled to junction 16 through lead 48 and switch S3-1. The switching contacts S1-1, S2-1 and S3-1 are controlled by the relays S1 through S3, respectively. Relay S1 is coupled between the supply voltage 87 and lead 88 which is connected to the output of NOR gate P. The NOR gate P has two input leads 72 and 90, respectively. Also, connected to input lead 90 of NOR gate P via lead 91 is relay S2. The other side of relay S2 is coupled to the supply voltage 87. Relay S3 is coupled between the supply voltage 87 and lead 92 which receives a signal from the comparator F. The leads 90 and 92 shown in FIG. 6 correspond to the lead 24 shown in FIG. 1 of the block diagram.

The purpose of the switching circuit G is to either couple the integrated signal VINT from the integrator to output junction 25, or couple the steady state signal VEP from the converter E to junction 25. This is accomplished by operation of the relays S2 and S3. The inputs to lines 90 and 92 labeled "end point" and "not end point", which are also outputs from the comparator F, are complementary logic signals so that when one is logic "1" the other is logic "0" and vice versa. When a signal "end point" coming from the converter is a logic "1" indicating that the "end point" of a slope has been reached the relay S2 is de-energized and the relay S3 is energized, opening contact S2-1 and closing contact S3-1, respectively. When contact S3-1 is closed the steady state voltage VEP representing end point voltage coming from converter E over lead 48 is coupled to the output junction 25 through the switching circuit G. This steady state analogue signal is applied through lead 21 to the controller and, also to the comparator F. When the steady state signal is applied to the controller it produces a zero slope, as illustrated in FIG. 2.

When the signal "end point" coming in on lead 90 indicates that the end point of the slope has not been reached, relay S2 is energized and relay S3 is de-energized. Such, in turn, causes switching contact S2-1 to be closed and switching contact S3-1 to be opened. This allows the output of the integrator to be coupled to the output junction 25 which is, in turn, coupled to the controller H and comparator F, for causing the controller to vary the temperature of the medium according to the integrated signal which corresponds to the desired slope.

It is, of course, understood that while the integrator D is described as including the operational amplifier A4 and the feed-back capacitor 13, as well as the resistor network 75, when the switch contact S2-1 is open, actually it is no longer an integrator since the feed-back capacitor 13 is no longer connected to the output of the operational amplifier A4. However, when it is desired to have an integrated signal on the output terminal 25, the feed-back capacitor 13 is coupled to the output of the operational amplifier A4 through contact S2-1, When the output from the integrator D is less than the steady state signal VEP coming from the digital to analogue converter E during the generation of the slope, switch S2-1 remains closed. The integrator during this period produces an integrated signal at junction 25 having an amplitude proportional to the time integral of the slope signal V-slope coming in on input lead 65. The proportionality constant for the integrator is partially controlled by the resistor network 75. When it is desired to generate a non-zero slope, as indicated in FIG. 2, switch S1-1 remains open so that the resistance of network 75 is determined by resistance 76. Thus, the slope produced at junction 25 is a function of the slope voltage coming in on lead 65. When it is desired to generate an infinite slope at junction 25 the switch S1-1 is closed placing resistor 78 in shunt with resistor 76. By making resistor 78 a small value as compared to resistor 76 the proportional constant of the integrator is increased to a very large value in comparison to its value when the switch S1-1 is open so that a substantially infinite slope signal is produced at junction 25. Switch contact S1-1 is controlled by a relay S1, which is coupled to the output of NOR gate P. Whenever there is a logic "1" on either of the inputs 72 or 90 of the NOR gate P, there will be a logic "0" on the output lead 88 which energizes relay S1. Such is the case when the "infinite slope" signal from the converter C is logic "1" or when the "end point" signal from the comparator F is logic "1".

A brief summary for the purpose of clarification of the integrator, and the switching circuit G will be discussed. During the generation of a non-zero slope as indicated in FIG. 2, the signal "end point" is a logic "0" and the signal "not end point", from comparator F is a logic "1" so that relay contact S2-1 is closed and relay contact S3-1 is open. At this time the voltage on lead 65 from converter C, which has the proper polarity and magnitude as discussed before, is integrated by the integrator D producing an integrated signal at junction 25 of the desired slope. This signal is fed to the controller H for varying, for example, the temperature of the medium under control, and it is fed to the comparator F which determines when the end point of the slope has been reached, which will be described below in connection with the description of the comparator F. When the integrated signal at the junction 25 becomes equal to the steady state signal VEP from the converter E, the comparator causes the signals "end point" and "not end point" to reverse state so that switch contact S2-1 is open, switch contact S3-1 is closed, and switch contact S1-1 is closed. As described previously, the voltage on line 65 from converter C becomes zero. In this state, the steady state voltage coming from converter E is fed through switch S3-1 to the output junction 25 supplying a steady state signal to the controller H for producing a zero slope as indicated in FIG. 2. The capacitor 13 is coupled to the steady state voltage VEP at junction 25 and to the zero voltage signal on input lead 65 through the resistive network 75 whose value of resistance is small at this time since relay contact S1-1 is closed. Thus, as long as the switching contacts remain in this state the charge on capacitor 13 remains at a potential equal to the end point voltage of the slope or steady state signal. Thus, when new information is fed from the programmer 10 to the digital registers A and B to begin a new cycle involving a new non-zero slope and new end point, the new slope begins at the prior end point.

When it is desired to generate an infinite slope the cycle of operation is the same as just described except that switch contact S1-1 remains closed throughout the entire cycle producing an infinite slope signal at junction 25 until the voltage at junction 25 becomes equal to the steady state voltage coming from converter E.

Referring to FIG. 7, there is illustrated the comparator F. The comparator includes a high gain differential amplifier A5 which has a pair of inputs VOUT and VEP coupled to leads 21 and 48, respectively. Interposed in lead 48 is a resistor 93. Connected between the output terminal 94 of the differential amplifier and input lead 48, and between resistor 93 and the operational amplifier is a feed-back resistor 95. The resistors 93 and 95 are tied to the non-inverting input of the differential amplifier A5. Lead 21 is connected to the inverting input of the amplifier A5. Resistors 93 and 95 form a positive feed-back loop around amplifier A5 for causing the amplifier A5 to switch substantially instantaneously from its maximum positive voltage to its maximum negative voltage when the input signal VOUT coming in on lead 21 becomes greater than the voltage VEP on lead 48 and vice-versa. It is noted that during the generation of a slope the analogue signal VOUT coming in on lead 21 is coupled to the output of the integrator through the switching circuit G so that the signal VOUT is equivalent to the signal VINT at this time.

An additional purpose of resistors 93 and 95 is to insure that the output of the amplifier A5 is either at its maximum or minimum value. The output of amplifier A5 is fed through lead 68 to the converter C. The output of the amplifier A5 is also coupled via lead 97 to the input of NAND gate N10. The output of NAND gate N10 is coupled via lead 69 to the converter C. A clamping diode 96 is coupled between the output of amplifier A5 and ground for preventing the output of the amplifier from going negative. Thus, using the combination of the feed-back loop including resistors 93 and 95, and the clamping diode 96, the output of the high gain differential amplifier A5 is in the form of logic levels by assuming either a value of zero or a positive value determined by the maximum output of the amplifier, depending on the relative magnitudes of the analogue signals appering on leads 21 and 48. Coupled between the inputs of NAND gate N10 and NAND gate N11 is a differentiator 98. Another differentiator 99 is connected between the output of NAND gate N10 and another input of NAND gate N11. The output of NAND gate N11 is coupled to the input of NAND gate N12. Another input of NAND gate N12 is coupled to lead 67 for receiving a "not shift" logic signal from the program control circuit 10a. The "not shift" signal coming in on lead 67 is also supplied via lead 100 to one input of flip-flop 101. The other input of flip-flop 101 is coupled via lead 102 to the output of NAND gate N12. The output of flip-flop 101 is coupled to lead 90 for producing an "end point" signal and is also coupled through a NAND gate N13 for producing a "not end point" signal on lead 92.

The operation of the differentiators 98 and 99 are such that when an input coming therein changes from a logic "1" level to a logic "0" level, a logic "0" pulse is produced at the output. The output of the differentiator remains logic "1" except when the previously described transition takes place at the input. The operation of the flip-flop 101 is such that the output connected to lead 90 is set to a logic "1" by applying a logic "0" signal to the input connected to lead 102, while the input connected to lead 100 is at logic "1". The output of the flip-flop 101 connected to lead 90 is reset to logic "0" by applying a logic "0" signal to the input connected to lead 100, while the input connected to lead 102 is in the logic "1" state.

In summarizing the operation of the comparator F, at the very beginning of each cycle of operation, the "not shift" signal goes to logic "0" and is applied to lead 67 which causes the output of NAND gate N12 to go to a logic "1" which is, in turn, supplied to one input of the flip-flop 101. The other input connected to lead 100 is a logic "0", therefore appearing on the output lead 90 of flip-flop 101 is the logic "0" signal and on the output lead 92 is the logic "1" signal representing "end point" and "not end point", respectively. The "not shift" signal coming from the program control circuit 10a is only applied momentarily. In other words, it is applied only during the time that new information is shifted into the registers A and B.

When the "end point" of the slope is reached, the output of amplifier A5 switches from a positive voltage to zero volts or vice versa, depending on whether the signal coming in on lead 21 was greater than or less than the steady state signal VEP at the beginning of the cycle. At the time of the transition of the output of amplifier A5, either differentiator 98 or 99 will see a negative transition at its input depending on the direction of the transition of the amplifier A5. Therefore, one of the inputs of NAND gate N11 will receive a logic "0" pulse producing a logic "1" pulse on one input of NAND gate N12. Since the other input of NAND gate N12 is being supplied with the logic "1" signal, the output of NAND gate N12 supplies a logic "0" pulse to lead 102 coupled to the input of flip-flop 101, causing the output of flip-flop 101 connected to lead 90 to be locked in logic "1" state. This also causes the "not end point" signal appearing on the output lead 92 to be locked in the logic "0" state. Flip-flop 101 remains in the "1" state until the "not shift" signal is changed to the logic "0" state at the beginning of the next cycle. The outputs of the comparator appearing on leads 68 and 69 are complementary logic signals indicating whether or not the signal on lead 21 is greater than the end point signal VEP.

In summarizing the operation of the entire apparatus reference is made to FIGS. 1 and 2. The respective operations of the blocks shown in FIG. 1 will be described broadly showing the inter-relationship between the various components. At the beginning of each cycle of operation a logic "0" "not shift" signal is supplied by the program control circuit to the digital to analogue converter C and the comparator F. This causes the digital to analogue converter C to produce an output voltage V-slope equal to zero. The comparator F produces an "end point" output signal of logic "0" indicating that the end point of the slope has not been reached. This "end point" signal from the comparator causes switching circuit G to assume a position wherein the integrator D is coupled to the output terminal 25.

The program control circuit then directs the information to be fed from the program 10 to the digital registers A and B. The information stored in digital register A represents the desired slope of variations in the temperature of the medium during the first cycle of operation. The information stored in the digital register B represents the end point of the slope line or the beginning of the zero slope portion of the signal during the cycle. Information is also supplied to the program timer 11 indicating the duration of the zero slope portion of the cycle. As the information is stored in the registers A and B, corresponding information is immediately supplied to the digital to analogue converters C and E, respectively. The digital to analogue converter E immediately generates an end point voltage VEP which is supplied to the switching circuit G and the comparator F. The output of digital to analogue converter C remains "0" due to the logic "0" "not shift" signal. After a predetermined time the program control circuit changes the "not shift" signal from a logic "0" to a logic "1". Digital to analogue converter C then produces an analogue output signal V-slope which is indicative of the new desired slope. Integrator D begins integrating the V-slope signal producing an integrated signal having an amplitude proportional to the time integral of the V-slope signal. The integrated signal is supplied through switching circuit G to the output junction 25. This signal is, in turn, fed to the controller H for causing the controller to vary the temperature of the medium according to the integrated signal. During this period of slope generation comparator F continually compares the integrated signal VINT with the steady state signal VEP. When the integrated signal VINT becomes equal to the steady state signal VEP, the comparator sends its signal to the integrator D, the switching circuit G, the digital to analogue converter C, and the program timer 11, indicating that the end point of the slope has been reached. The signal received by the integrator causes the input resistance of the integrator to be reduced to a small value. The signal received by the switching circuit causes the switching circuit to connect the steady state voltage VEP to the output terminal 25 and disconnects the integrator D. This also puts the capacitor 13 in the holding configuration. The end point signal being received by the digital to analogue converter C causes its output to go to zero volts completing the holding configuration for capacitor 13. The end point signal received by the program timer 11 causes the timer to begin timing for an interval determined by the program information previously supplied thereto. Since the switching circuit G now connects junction 25 to the output of the digital to analogue converter E, a steady state voltage is supplied thereto, and to the controller H for maintaining the temperature of the medium constant for a given period of time which is under control of the program timer 11. After the timer times out the interval, information is supplied therefrom to the program control circuit 10a which initiates a new cycle.

If an infinite slope is desired in a particular cycle, the operation and device is the same as previously described with the exception that when the information in register A determining an infinite slope is decoded, an infinite slope signal is generated and fed to the integrator D for reducing the input resistance of integrator D to a level so that the integrator produces an output signal with a slope which is substantially infinite, as shown in FIG. 2 of the drawings. The output of the digital to analogue converter C at this time produces a signal of a predetermined level so that the integrator has an input voltage to integrate. At the beginning of each cycle of operation, as soon as the information is loaded in register B representing a new end point signal, such is compared with the output of the integrator D appearing at junction 25 by the comparator F producing a compared signal, which is in turn, fed to the digital to analogue converter C indicating the polarity of the output of the converter C and thus the sign of the desired slope.

While the preferred embodiment of the invention has been described using specific terms, such description is for illustrative purposes only, and it is to be understood that changes and variations may be made without departing from the spirit or scope of the following claims.

What is claimed is:

1. An apparatus for controlling the operation process of a system according to a predetermined operating cycle comprising a first means providing a slope signal representing a rate of change that said process is to be varied during said operating cycle, an integrator coupled to said first means for generating an integrated signal having an amplitude proportional to the time integral of said slope signal, second means providing a steady state signal representing the end point of said operating cycle, a comparator, means for supplying said integrated signal to said comparator, means for supplying said steady state signal representing said end point to said comparator to be compared with said integrated signal, said comparator including means for generating a compared signal indicating whether said integrated signal is as large as said steady state signal, a switching circuit having an output, a controller coupled between said output of said switching circuit and said physical system, means for coupling said means to said switching circuit, means for coupling said integrator to said switching circuit, means for coupling said comparator to said switching circuit for causing said switching circuit to couple either said integrated signal or said steady state signal representing said end point to said controller, and said controller varying the operation of said physical system according to said signal supplied thereto.

2. An apparatus for controlling the operation of a device according to a predetermined program comprising: means for generating an analogue rate of change signal indicating the desired rate at which the operation of said device is to be varied; means for generating a steady state signal indicating a particular state at which said operation of said device is to be held constant; a comparator having an input and an output; means for coupling said rate of change signal and said steady state signal to said input of said comparator causing said comparator to generate a compared signal indicating whether said rate of change signal has reached a magnitude equal to said steady state signal; a switching circuit coupled to said means for generating said analogue rate of change signal and said means for generating said steady state signal; a controller coupled between said switching circuit and said device; means for coupling said output of said comparator to said switching means for supplying said compared signal to said switching means for causing said switching means to couple either said steady state signal or said analogue rate of change signal to said controller; whereby said analogue rate of change signal is supplied to said controller for varying the operation of said device and said steady state signal is supplied to said controller for holding the operation of said device constant.

3. An apparatus for controlling temperature variations of a medium during a process according to a predetermined program comprising: a first digital register for storing information in the form of a rate of change signal indicative of the desired rate of change in temperture of said medium during said process; a second digital register for storing information in the form of a steady state signal representing the end point of said rate of change of said temperature of said medium; a first digital to analogue converter coupled to the output of said first digital register for converting said rate of change signal to an analogue signal representing rate of change, an integrating means coupled to the output of said first digital to analogue converter for integrating said analogue signal representing rate of change producing an integrated signal; a second digital to analogue converter coupled to the output of said second digital register producing a second analogue signal representing the end point of said change of said temperature of said medium; a comparator coupled to the output of said integrator and said second digital to analogue converter for generating a compared signal indicating whether said integrated signal or said steady state signal is larger; a switching circuit coupled to said integrating means and said second digital to analogue converter; a controller coupled between said switching circuit and said medium whose temperature is being controlled; means for coupling said comparator to said switching circuit for causing said integrated signal or said second analogue signal to be coupled to said controller depending on the compared signal, and said controller including means for varying the temperature of said medium according to said integrated signal and holding said temperature steady according to said second analogue signal.

4. The apparatus as set forth in claim 3, wherein said comparator includes means for generating a sign indicating signal which indicated whether said integrated signal must increase or decrease to become equal to said second analogue signal, means coupled to said first digital to analogue converter for receiving said sign indicating signal for causing said signal representing change of temperature produced by said first digital to analogue converter to have a polarity determined by said sign indicating signal.

5. The apparatus as set forth in claim 3, further comprising: means for supplying new information to said first and second registers directing a new rate of change of said temperature of said medium and a new end point for said new rte of change.

6. The apparatus according to claim 5, wherein said integrator includes; an operational amplifier and a capacitor; means for coupling said capacitor to said second digital to analogue converter when said second analogue signal is coupled to said controller for maintaining a charge on said capacitor substantially equal to the potential of said second analogue signal; whereby when new information is supplied to said registers said integrator begins integrating at the previous end point.

7. An apparatus for controlling the temperature variation of a medium during an operational process comprising: a switching circuit; means for supplying analogue information to said switching circuit indicating the desired change of said temperature of said medium during a given period of time; means for supplying steady state information to said switching circuit indicating the end point of said change of said temperature of said medium; a comparator; means for supplying said analogue information and said steady state information to said comparator; said comparator including means for generating a compared signal indicating whether said amplitude of said analogue information representing the desired change has reached the end point represented by said steady state signal; a controller coupled between said switching circuit and said medium provided for receiving information from said switching circuit, and means for coupling said compared signal from said comparator to said switching circuit for causing said analogue information representing change of temperature to be coupled through said switching circuit to said controller when it is desired to change the temperature of said medium and for causing said steady state information to be coupled through said switching circuit to said controller when it is desired to hold the temperature of said medium constant.

8. An apparatus for controlling the operating process of a device comprising: an integrator for generating integrated information representing a desired change in said process; means for generating steady state information of a predetermined potential indicating the desired end point of said change in said process; a switching circuit having an output coupled to said device; a comparator having inputs and an output; means for coupling said integrator to said comparator and said switching circuit; means for coupling said means for generating steady state information to said comparator and said switching circuit; said comparator indlcuing means for generating a compared signal indicating whether said integrated signal is equal to said steady state signal; means for coupling said compared signal to said switching circuit for causing said integrated information to be coupled through said switching circuit when it is desired to change the operating process of said device and for causing said steady state information to be coupled through said switching circuit to said device when it is desired to hold the operating process constant.

9. The apparatus as set forth in claim 8 wherein; said integrator includes a capacitor, means for coupling said capacitor to said steady state information when said steady state information is coupled to said device for maintaining a potential on said capacitor substantially equal to said steady state information.

10. The apparatus as set forth in claim 7 further comprising: a resistor network coupled to an input of said integrator; means for decreasing the resistance of said resistor network responsive to receiving a predetermined signal for causing said integrator to produce an integrated signal of substantially infinite slope.

* * * * *